US008754990B2

(12) United States Patent
Neuman et al.

(10) Patent No.: US 8,754,990 B2
(45) Date of Patent: Jun. 17, 2014

(54) METHOD AND SYSTEM FOR PROCESSING CHROMA SIGNALS

(75) Inventors: Darren Neuman, Palo Alto, CA (US); Jaewon Shin, Santa Clara, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1439 days.

(21) Appl. No.: 11/855,678

(22) Filed: Sep. 14, 2007

(65) Prior Publication Data

US 2009/0073319 A1   Mar. 19, 2009

(51) Int. Cl.
*H04N 9/78* (2006.01)

(52) U.S. Cl.
USPC ............................. 348/668; 348/669; 348/670

(58) Field of Classification Search
USPC .................................................. 348/668–670
See application file for complete search history.

(56) References Cited

U.S. PATENT DOCUMENTS

| | | | | | |
|---|---|---|---|---|---|
| 4,217,603 | A | * | 8/1980 | Hjortzberg | 348/457 |
| 4,553,157 | A | * | 11/1985 | Hurst et al. | 348/631 |
| 4,855,812 | A | * | 8/1989 | Rokuda et al. | 348/566 |
| 5,418,574 | A | * | 5/1995 | Miyabata et al. | 348/625 |
| 5,515,112 | A | * | 5/1996 | Penney | 348/630 |
| 5,598,274 | A | * | 1/1997 | Ogura et al. | 386/207 |
| 6,031,581 | A | * | 2/2000 | Harrington | 348/630 |
| 2002/0140865 | A1 | * | 10/2002 | Matsushita et al. | 348/631 |
| 2004/0109089 | A1 | * | 6/2004 | Shih et al. | 348/663 |
| 2005/0162560 | A1 | * | 7/2005 | Movshovich et al. | 348/631 |
| 2005/0168644 | A1 | * | 8/2005 | Demas et al. | 348/630 |
| 2006/0050182 | A1 | * | 3/2006 | Lee et al. | 348/631 |
| 2007/0081741 | A1 | * | 4/2007 | Diggins et al. | 382/278 |

* cited by examiner

*Primary Examiner* — Gigi L Dubasky
(74) *Attorney, Agent, or Firm* — Foley & Lardner LLP; Christopher J. McKenna; Daniel Rose (57) ABSTRACT

Methods and systems for processing chroma signals are disclosed. Aspects of one method may include compensating a modulated chroma signal for distortions due to audio trap filtering. The compensated chroma signal may be demodulated to generate U and V chroma signals. The U and V chroma signals may be low pass filtered, and then YC aligned. YC alignment may comprise correcting portions of the U and V chroma signals based on the luma signal. The correction may be based on, for example, correlation between the U and V chroma signals and the Y luma signal, and/or energy level of the Y luma signal. The corrected U and V chroma signals may be chroma sharpened, where a gain parameter may be changed to change a transition slope for the U and V chroma signals. The chroma sharpened signals may also be clamped to reduce overshoot and undershoot.

20 Claims, 7 Drawing Sheets

METHOD AND SYSTEM FOR PROCESSING CHROMA SIGNALS

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing video data. More specifically, certain embodiments of the invention relate to a method and system for processing chroma signals.

BACKGROUND OF THE INVENTION

One format for color encoding is the YUV format, where the signals in the YUV format are derived from the RGB format. The RGB color format is the color format captured by the analog and digital cameras. The Y channel in YUV is the "luma" or luminance channel, which carries brightness information, and is a sum of the R, G, and B color signals. The U and V channels in the YUV format are the chroma channels, and carry the color information. The U channel carries blue minus luma (B-Y) information, and the V channel carries red minus luma (R-Y) information. Through a process called "color space conversion," the video camera converts the RGB data captured by its sensors into either composite analog signals (YUV) or component versions (analog YPbPr or digital YCbCr). For rendering on a TV screen, these color spaces are converted back to RGB format by the TV or display system. Various standardized equations are used to represent the conversion of RGB to YUV.

The original TV standard combined the luma (Y) channel and both chroma channels (U and V) into one channel, which is known as "composite video." An option known as "S-video" or "Y/C video" keeps the luma channel separate from the color channels, using one cable, but with separate wires internally. S-video provides a bit sharper images than composite video. When the luma channel and each of the color channels (B-Y and R-Y) are maintained separately, it is called "component video." Component video is designated as YPbPr when in the analog domain and YCbCr when in the digital domain. In practice, YUV refers to the color difference encoding format whether composite or component, and "YUV," "Y, B-Y, R-Y" and "YPbPr" are used interchangeably for analog signals. Sometimes, "YCbCr," which is digital, may be used interchangeably as well.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for processing chroma signals, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing chroma signals. Aspects of the invention may comprise compensating a modulated chroma signal for distortions due to audio trap filtering. The compensated chroma signal may be demodulated to generate U and V chroma signals. The U and V chroma signals may be low pass filtered, and then luma/chroma (YC) aligned. YC alignment may comprise determining a correlation value for corresponding portions of U and V chroma signals and a Y luma signal. A correction signal may be generated based on the correlation value, and the correction signal may be used to replace a portion of each of the U and V chroma signals to form corrected U and V chroma signals. The correlation value may be, for example, a Pearson product moment correlation. The generation of the correction signal may be based on, for example, energy level of the Y luma signal. The corrected U and V chroma signals may be chroma sharpened, where a gain parameter may be changed to change a transition slope for the U and V chroma signals. The chroma sharpened signals may also be clamped to reduce overshoot and/or undershoot.

Figure 1:
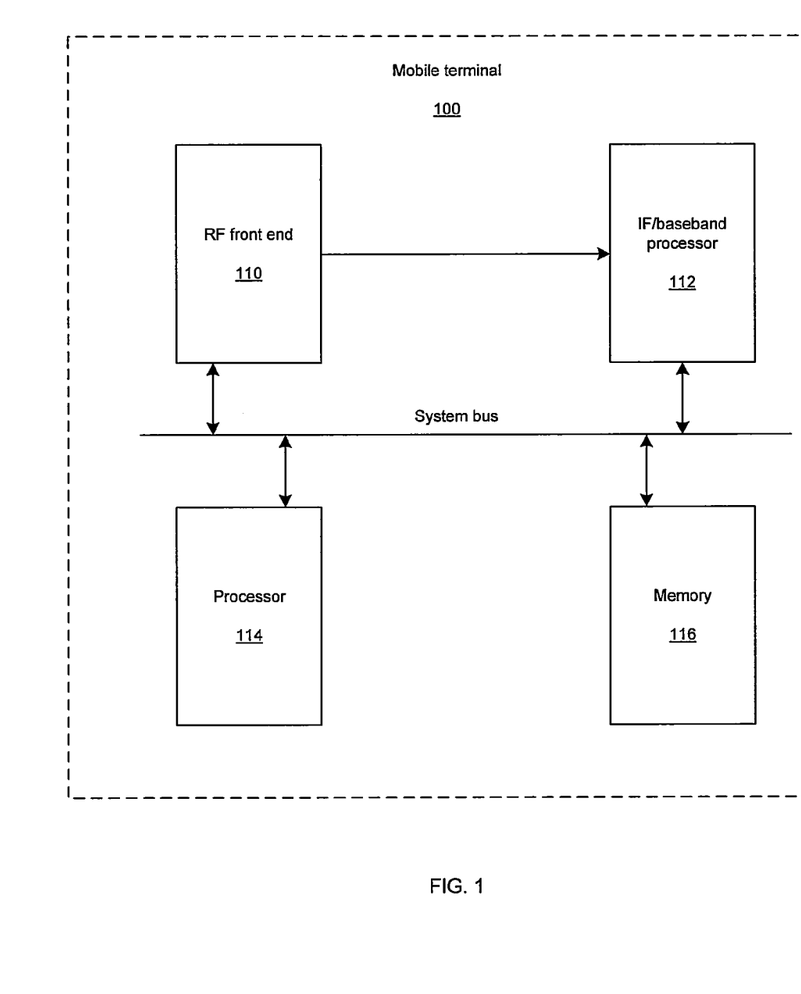
FIG. 1 is an exemplary diagram of a portion of an electronic device, in accordance with an embodiment of the invention.

FIG. 1 is an exemplary diagram of a portion of an electronic device, in accordance with an embodiment of the invention. Referring to FIG. 1, there is shown an electronic device 100. The electronic device 100 may comprise a RF front end 110, an IF/baseband block 112, a processor 114, and a memory block 116. The RF front end 110 may comprise suitable circuitry and/or logic that may enable reception of transmitted radio frequency (RF) signals. The received RF signals may be demodulated and/or down-converted to intermediate frequency (IF) signals. The IF signals may be communicated to, for example, the IF/baseband block 112 for further processing.

The IF/baseband block 112 may comprise suitable circuitry, logic, and/or code that may enable processing of the IF signals from the RF front end 110. For example, the IF/baseband block 112 may perform chroma demodulation to extract the two chroma components U and V from the modulated chroma signal. The IF/baseband block 112 may also separate the video signals from audio signals using an audio trap filter. However, various components of the video signals may be distorted due to audio trap filtering and/or chroma demodulation. Accordingly, the video signals may be processed by the IF/baseband block 112 to compensate for the distortion.

The processor 114 may determine the mode of operation of various portions of the electronic device 100. For example, the processor 114 may select gain parameters in the IF/baseband block 112 to allow optimization of video signal processing by the IF/baseband block 112. The processor 114 may also communicate instructions to the RF front end 110 to set gain parameters and/or filtering parameters, for example. The memory block 116 may be used to store image data that may be processed and communicated by the IF/baseband block 112. The memory block 116 may also be used for storing code and/or data that may be used by the processor 114. The memory block 116 may also be used to store data for other functionalities of the electronic device 100. For example, the memory block 114 may store data corresponding to voice communication.

In operation, the processor 114 may set various parameters for the RF front end 110 and the IF/baseband block 112. The parameters may be determined by, for example, the type of video signal being received. The video signal may be transmitted in one of several standards, such as, NTSC, PAL, or SECAM. The RF signals may be received by one or more antennas (not shown), and the received RF signals may be processed to result in IF signals. The IF signals may be further processed by the IF/baseband block 112. Processing the IF signal, for example, to separate the video signal from the audio signal, and chroma demodulation, may result in video signal distortion. The IF/baseband block 112 may process the video signals to alleviate some of this distortion. Additionally, since the chroma components of the video RF signal may use smaller bandwidth than the luma components, additional processing may be useful for enhancing the quality of the chroma components. The additional chroma processing may comprise, for example, "sharpening" the chroma signals. The video IF signal processing is described in more detail with respect to FIG. 2.

Figure 2:
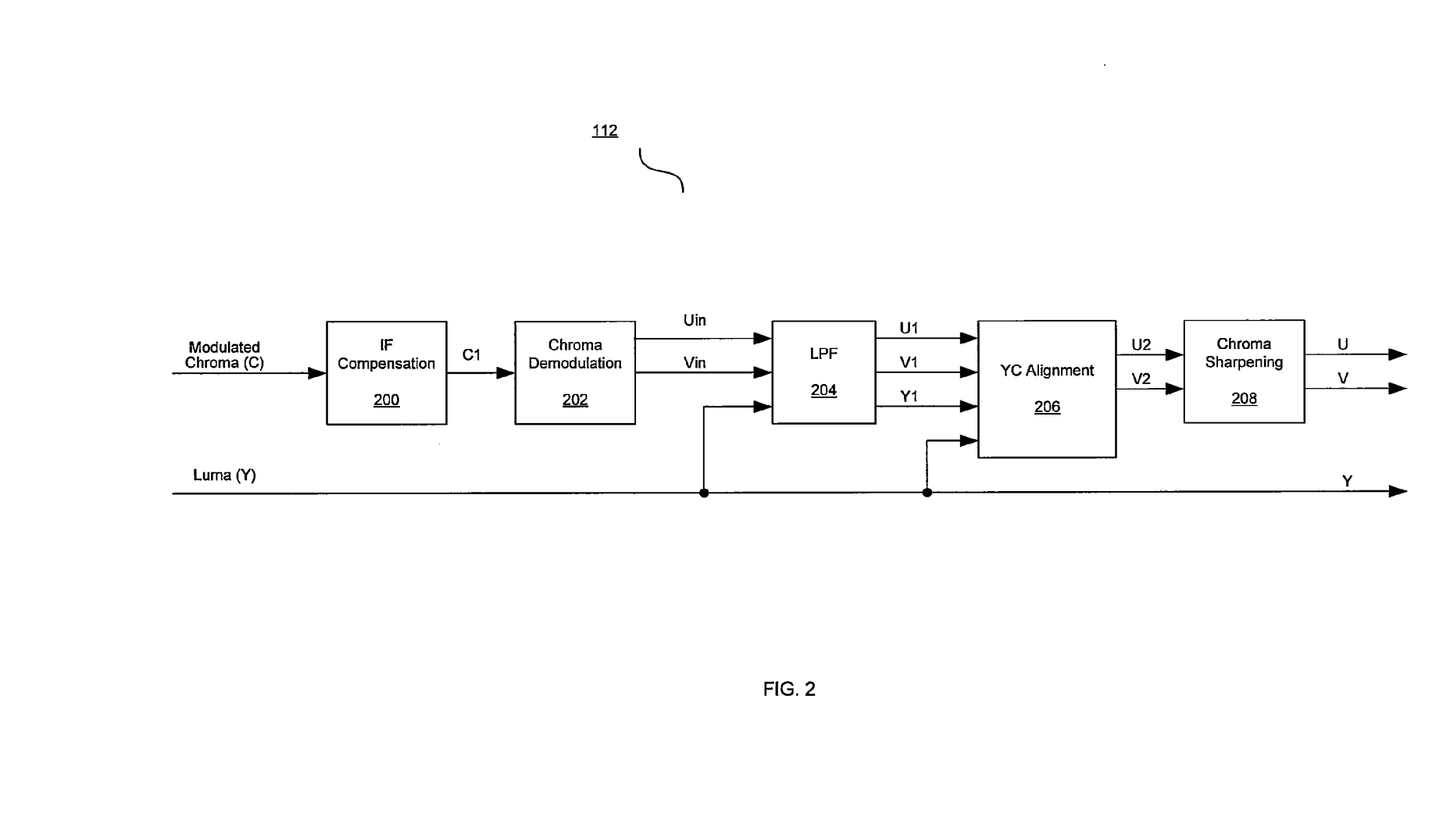
FIG. 2 is a block diagram illustrating exemplary IF video processing circuitry, in accordance with an embodiment of the invention.

FIG. 2 is a block diagram illustrating exemplary IF video processing circuitry, in accordance with an embodiment of the invention. Referring to FIG. 2, there is shown the IF/baseband block 112, which may comprise a compensation block 200, a chroma demodulation block 202, a low pass filter block 204, a YC alignment block 206, and a chroma sharpening block 208. The compensation block 200 may comprise suitable logic, circuitry, and/or code that may enable receiving a composite chroma signal and providing compensation to alleviate distortion due to audio trap filtering. The chroma demodulator block 202 may comprise suitable logic, circuitry, and/or code that may enable demodulating a composite chroma signal to generate U and V chroma signals. The low pass filter block 204 may comprise suitable logic, circuitry, and/or code that may enable filtering of signals so as to attenuate signal frequencies above a threshold frequency. The threshold frequency and the amount of attenuation may be design and/or implementation dependent.

The YC alignment block 206 may comprise suitable logic, circuitry, and/or code that may enable determining correlation between the U and V chroma signals with a corresponding Y luma signal. The correlation values may then be used to generate portions of signals that may be used to replace portions of the U and V chroma signals. The chroma sharpening block 208 may comprise suitable logic, circuitry, and/or code that may enable increasing a slope of falling and/or rising edge, while minimizing overshoot and/or undershoot.

In operation, a RF video signal may be suitably amplified, filtered, and down-converted to IF video signal in the RF front end 110, for example. The IF/baseband block 112 may process the IF signal to separate the composite chroma signal from the luma signal, and further process the separated composite chroma signal and the luma signal. The composite chroma signal and the luma signal may also be converted to digital signals by an analog-to-digital converter (not shown), if the RF signals are received as analog signals. The compensation block 200 may provide compensation to the composite chroma signal for distortions that may have been introduced due to audio trap filtering during the modulation and/or demodulation process. Some broadcast standards, such as, for example, SECAM, may not introduce distortions to the chroma signal due to audio trap filtering. Accordingly, the compensation block 200 operation may be bypassed for those signals.

The compensated composite chroma signal may then be demodulated by the chroma demodulation block 202 to generate U and V chroma signals. The U and V chroma signals may be low pass filtered by the low pass filter block 204, and the low pass filtered U and V chroma signals may be communicated to the YC alignment block 206. The Y luma signal may also be low pass filtered by the low pass filter block 204. Filtering by the low pass filter block 204 may, for example, attenuate high-frequency distortions in the U and V chroma signals and may reduce noise sensitivity to noise for the Y luma signal during YC alignment. However, the low pass filtering parameters for the Y luma signal may not be the same as the low pass filtering parameters for the U and V chroma signals. This may be to avoid providing high correlation everywhere between the U and V chroma signals and the Y luma signal, with the result that the YC alignment block 206 may over-correct perceived distortions.

The YC alignment block 206 may determine correlation between the U and V chroma signals and the Y luma signal. Depending on the correlation, the YC alignment block 206 may generate a signal portion using a portion of the Y luma signal. The generated signal portion may then be used to replace a corresponding signal portion of the U and V chroma signals. This may be useful, for example, because the composite chroma signal may use a smaller portion of a television channel bandwidth than a luma signal. Accordingly, the composite chroma signal may be more susceptible to interference and noise distortions. Additionally, the composite chroma signal may have more distortions because of a need for asymmetric frequency spectrum around a chroma sub-carrier due to audio trap filtering.

The YC aligned U and V chroma signals, which may be referred to as corrected chroma signals, may then be communicated to the chroma sharpening block 208. The chroma sharpening block 208 may function similarly to the compensation block 200. However, the chroma sharpening block 208 may also provide adaptive clamping to reduce overshoot and/or undershoot of the U and V chroma signals. Overshoots and undershoots may be undesirable since they may introduce visible artifacts such as "false colors" to displayed video.

Figure 3A:
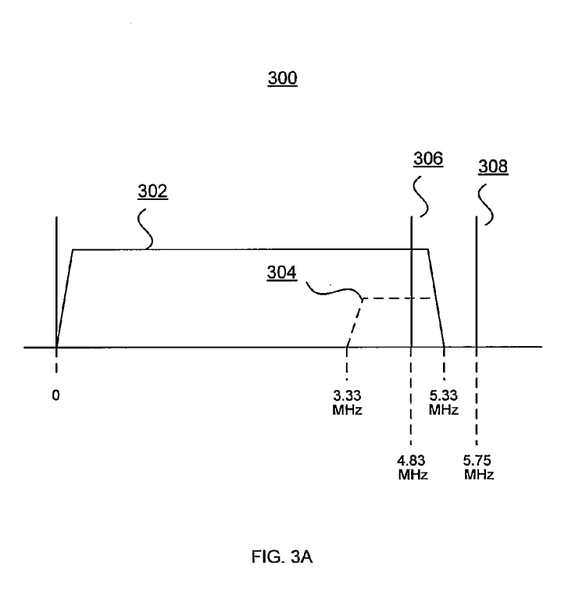
FIG. 3A is a diagram illustrating exemplary video frequency spectrum, in connection with an embodiment of the invention.

FIG. 3A is a diagram illustrating exemplary video frequency spectrum, in connection with an embodiment of the invention. Referring to FIG. 3A, there is shown a diagram of a color signal spectrum as defined by the National Television System Committee (NTSC) for broadcasting in the US, and other countries. The spectrum 300 may comprise a 6 MHz bandwidth per channel, where 5.33 MHz bandwidth 302 ranging from 0 to 5.33 MHz may be used for luma signal transmission. A 2 MHz bandwidth 304 ranging from 3.33 MHz to 5.33 MHz may be used for chroma signal transmission. The chroma signal may be modulated about a chroma sub-carrier frequency of 4.83 MHz. Accordingly, the chroma spectrum may be asymmetric about the chroma sub-carrier frequency of 4.83 MHz. A 25 KHz bandwidth 306 about an audio sub-carrier frequency of 5.75 MHz may be used for audio signal transmission.

The compensation block 200 and the chroma sharpening block 208 may provide compensation for signal attenuation due to signal roll-off for the high frequencies of the 2 MHz bandwidth 304. The signal roll-off may be due to filtering of the video signals by an audio trap filter (not shown) during a modulation and/or demodulation of the television signals.

While an NTSC standard television spectrum may have been described, the invention need not be so limited. Various embodiments of the invention may also be used for other transmission standards, such as, for example, PAL.

Figure 3B:
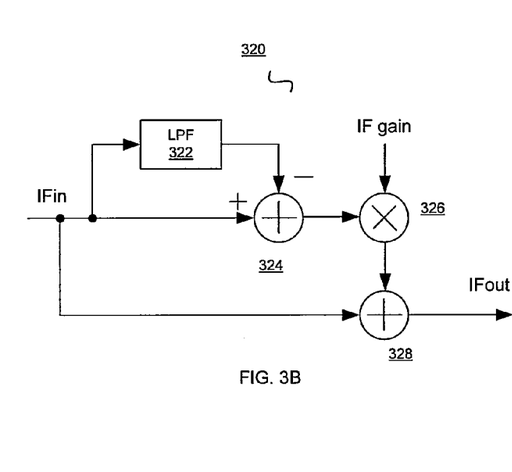
FIG. 3B is an exemplary block diagram illustrating IF compensation, in accordance with an embodiment of the invention.

FIG. 3B is an exemplary block diagram illustrating IF compensation, in accordance with an embodiment of the invention. Referring to FIG. 3B, there is shown an compensation block 320 that may comprise a low pass filter block 322, adder blocks 324 and 328, and variable gain amplifier block 326. The compensation block 320 may be similar to the compensation block 200.

The low pass filter block 322 may comprise suitable logic, circuitry, and/or code that may enable attenuating signal levels above a threshold frequency. The threshold frequency and the amount of attenuation may be design and/or implementation dependent. The adder blocks 324 and 328 may comprise suitable logic, circuitry, and/or code that may enable receiving two signals and summing the two signals to generate an output signal. The variable gain amplifier block 326 may comprise suitable logic, circuitry, and/or code that may enable amplification of an input signal to generate an output signal. The gain of the variable gain amplifier block 326 may be controlled by a processor such as, for example, the processor 114.

In operation, an original input signal IFin may be filtered by the low pass filter block 322. The output of the low pass filter block 322 may then be inverted and communicated to the adder block 324. The adder block 324 may then add the signal from the low pass filter block 322 to the original signal IFin. Accordingly, the output of the adder block 324 may be the high frequency signals that were filtered out by the low pass filter block 322. The high frequency signals may be amplified by a specified gain by the variable gain amplifier block 326. The gain of the variable gain amplifier block 326 may be adjusted to compensate for effects of different audio trap filters. The amplified high frequency signals may be added to the original input signal IFin by the adder block 328. Accordingly, the output of the adder block 328 may provide compensation for the higher frequencies of the original input signal IFin, which may have been attenuated. This compensation is described further with respect to FIGS. 6A and 6B.

Figure 3C:
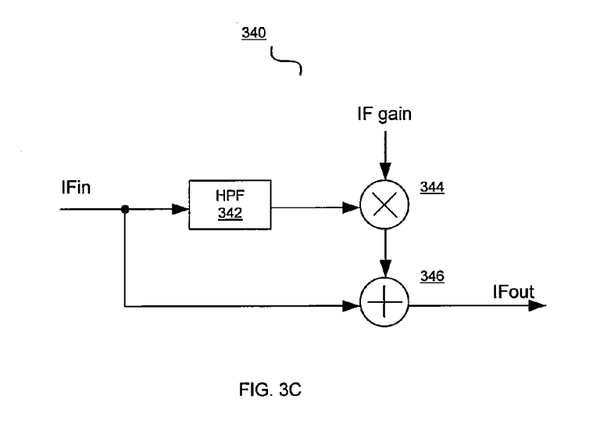
FIG. 3C is an exemplary block diagram illustrating IF compensation, in accordance with an embodiment of the invention.

FIG. 3C is an exemplary block diagram illustrating IF compensation, in accordance with an embodiment of the invention. Referring to FIG. 3C, there is shown a compensation block 340 that may comprise a high pass filter block 342, a variable gain amplifier block 344, and an adder block 346. The IF compensation block 320 may be similar to the compensation block 200. The high pass filter block 342 may comprise suitable logic, circuitry, and/or code that may enable attenuating signal levels below a threshold frequency. The threshold frequency and the amount of attenuation may be design and/or implementation dependent. The variable gain amplifier block 344 and the adder block 346 may be similar to the corresponding blocks described with respect to FIG. 3B.

In operation, the original input signal IFin may be filtered by the high pass filter block 342. The high frequency signal output by the high pass filter block 342 may be communicated to the variable gain amplifier block 344. The high frequency signals may be amplified by a specified gain by the variable gain amplifier block 344. The gain of the variable gain amplifier block 344 may be adjusted to compensate for effects of different audio trap filters. The amplified high frequency signals may be added to the original input signal IFin by the adder block 346. Accordingly, the output of the adder block 346 may provide compensation for the higher frequencies of the original input signal IFin, which may have been attenuated. The IF compensation is described further with respect to FIG. 6.

Figure 4A:
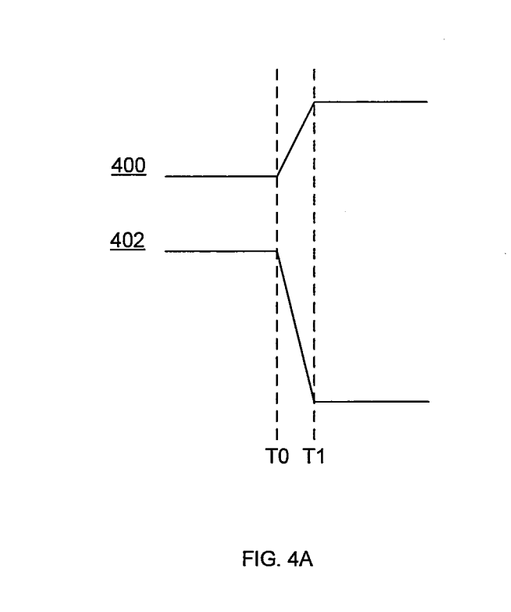
FIG. 4A is an exemplary diagram illustrating undistorted chroma signals, in connection with an embodiment of the invention.

FIG. 4A is an exemplary diagram illustrating undistorted chroma signals, in connection with an embodiment of the invention. Referring to FIG. 4A, there is shown an exemplary diagram of a chroma signal 400 and an exemplary diagram of a corresponding luma signal 402. The chroma signal 400 and the luma signal 402 may be, for example, the luma and chroma signals before being modulated to RF. Accordingly, the chroma signal 400 may not be distorted by the audio trap filter. The chroma signal 400 may, for example, transition at time instant 400 from a low level to a high level. At time instant T1, the chroma signal 400 may be stable at the high level. Similarly, the luma signal may transition from a high level to a low level at the time instant T0, and may reach a stable low level at the time instant 402.

Figure 4B:
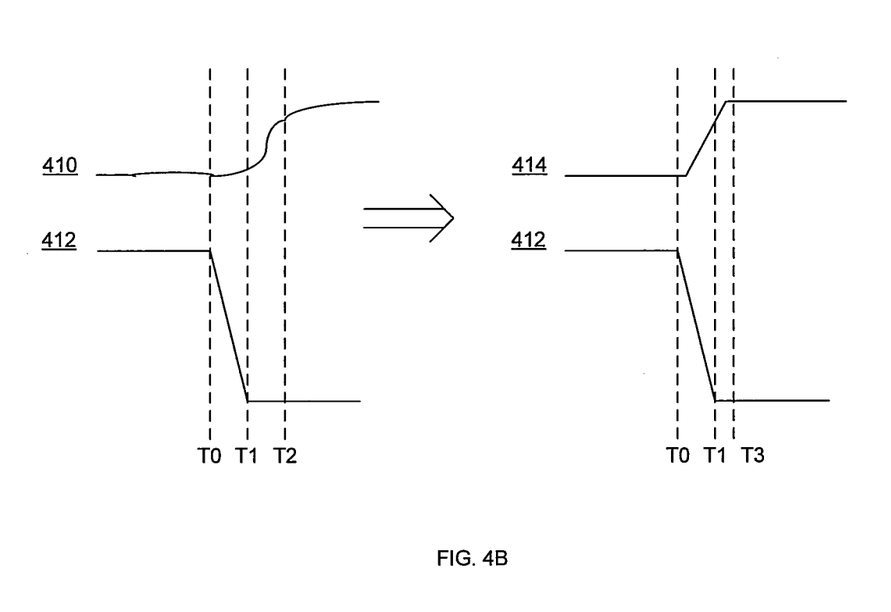
FIG. 4B is an exemplary diagram illustrating mitigating distortion in chroma signals, in accordance with an embodiment of the invention.

FIG. 4B is an exemplary diagram illustrating mitigating distortion in chroma signals, in accordance with an embodiment of the invention. Referring to FIG. 4B, there is shown a distorted chroma signal 410 and a relatively undistorted luma signal 412. The luma signal may still transition from a high level to a low level during the time period marked by the time instants T0 and T1. However, the distorted chroma signal 410 may take a longer time to transition from a low level to a high level. The longer transition time for the rising edge, or similarly, for a falling edge, of the chroma signal 410 and the non-linear transition may introduce visible artifacts to a viewer. Accordingly, various embodiments of the invention may reduce the transition time of the chroma signal to be closer to the transition time of the luma signal.

The YC alignment block 206 may utilize portions of the relatively clean and distortion free luma signal 412 to generate corrected signal portions that may be used to replace the distorted and noisy portions of the chroma signal 410. The result may be, for example, the corrected chroma signal 414. An exemplary function for generating the original chroma signal 400 may be, for example:

$$C_{corrected}(x)=a*Y(x)+b. \quad (1)$$

$C_{corrected}(x)$ may be the chroma signal 410 that was corrected using the luma signal Y(x). The variables 'a' and 'b' may comprise scaling and shifting parameters. The corrected portion may then replace the noisy portion of the chroma signal 410, and the result may be the corrected chroma signal 414.

Since the chroma and luma signals may be digital signals, the Equation (1) may be re-written as:

$$C_{corrected}[k]=a*Y[k]+b. \quad (2)$$

Where 'k' may indicate sample points for the digital chroma and luma signals. However, the method described by the equations above may be utilized, for example, in instances when the chroma and luma signals may be "similar" or correlated. Accordingly, the CY alignment block 206 may determine correlation between corresponding portions of the U and V chroma signals and the Y luma signal. The similarity measure may be made using Pearson product moment correlation γ, and the value of the Pearson product moment correlation γ may be a correlation confidence that may indicate whether to generate a "corrected" chroma component to replace the noisy portion of the chroma signal.

An exemplary algorithm may be used as follows:
if (correlation_confidence>threshold_value)

$$C_{corrected}[k]=a*Y[k]+b;$$

else $$C_{corrected}[k]=C[k].$$

Figure 5:
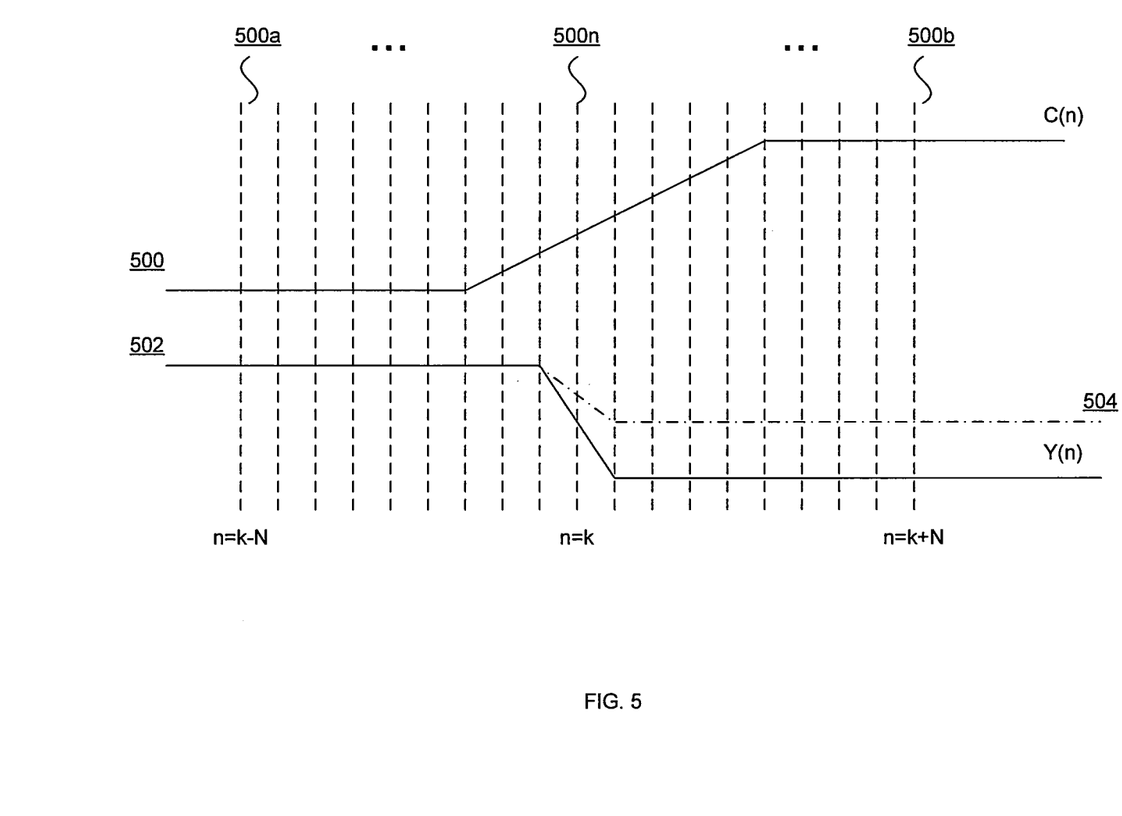
FIG. 5 is an exemplary diagram illustrating sampling of chroma and luma signals for use in alignment of the chroma and luma signals, in accordance with an embodiment of the invention.

However, this algorithm may be further refined to reduce the fixed threshold_value. For example, the correlation confidence measure, which may be represented by 'α,' may be used as follows:

$$C_{corrected}[k]=\alpha*(a*Y[k]+b)+(1-\alpha)*C[k]; \quad (3)$$

where α's range may be [0, 1]. An exemplary method of computation of the correlation confidence measure α and affine transform parameters 'a' and 'b' may be described with respect to FIG. 5.

FIG. 5 is an exemplary diagram illustrating sampling of chroma and luma signals for use in alignment of the chroma and luma signals, in accordance with an embodiment of the invention. Referring to FIG. 5, there is shown a series of samples 500a . . . 500b of the chroma signal 500 and the luma signal 502. The samples may comprise, for example, pixels. There is also shown a luma signal 504 whose transition is smaller than the transition of the luma signal 502.

The following discussion may apply to the chroma and luma signals 500 and 502, respectively, as well as to the chroma and luma signals 500 and 504, respectively. A pixel at the position n=k may use N pixels before it and N pixels after it to generate the correlation confidence measure α and the affine transform parameters 'a' and 'b.' Accordingly, the 2N+1 pixels used may indicate a window size of 2N+1. The method for determining the correlation confidence measure α and the affine transform parameters 'a' and 'b' may comprise generating a Pearson product moment correlation coefficient γ whose value may range from [−1, 1]. The Pearson product moment correlation coefficient γ may be defined as follows:

$$\gamma = \frac{\text{COV}(C,Y)}{\sqrt{\text{Var}(C)\text{Var}(Y)}} \quad (4)$$

$$= \frac{\left((2N+1)\cdot\sum_{i=-N}^{N}C[k+i]\cdot Y[k+i] - \sum_{i=-N}^{N}C[k+i]\cdot\sum_{i=-N}^{N}Y[k+i]\right)}{\sqrt{\left((2N+1)\cdot\sum_{i=-N}^{N}C^2[k+i]-\left(\sum_{i=-N}^{N}C[k+i]\right)^2\right)}\sqrt{\left((2N+1)\cdot\sum_{i=-N}^{N}Y^2[k+i]-\left(\sum_{i=-N}^{N}Y^2[k+i]\right)^2\right)}}$$

$$= \frac{M\cdot S_{YC}(k)-S_C(k)\cdot S_Y(k)}{\sqrt{(M\cdot S_{C2}(k)-(S_C(k))^2)(M\cdot S_{Y2}(k)-(S_Y(k))^2)}}$$

where $M = 2N+1$ $$S_Y(k) = \sum_{i=-N}^{N} Y[k+i]$$

$$S_C(k) = \sum_{i=-N}^{N} C[k+i]$$

$$S_{C2}(k) = \sum_{i=-N}^{N} C^2[k+i]$$

$$S_{Y2}(k) = \sum_{i=-N}^{N} Y^2[k+i]$$

$$S_{YC}(k) = \sum_{i=-N}^{N} Y[k+i]\cdot C[k+i]$$

where M may be the window size, Sγ(k) may be the local sum of luma, and $S_c(k)$ may be the local sum of chroma. $S\gamma^2(k)$ may be a local sum of luma squared, $Sc^2(k)$ may be a local sum of chroma squared, and Sγc(k) may be a local sum of a cross-product of luma and chroma.

The Pearson product moment correlation coefficient γ may take the value of 1 or −1 when the chroma and luma signals are affine transform of each other. However, since the correlation confidence measure α may be a non-negative number, the Pearson product moment correlation coefficient γ may be squared and used as the correlation confidence measure.

$$\alpha = \gamma^2 \quad (5)$$

$$= \frac{(M\cdot S_{YC}(k)-S_C(k)\cdot S_Y(k))^2}{(M\cdot S_{C2}(k)-(S_C(k))^2)(M\cdot S_{Y2}(k)-(S_Y(k))^2)}$$

Using the squared Pearson product moment correlation removes the squared root in the denominator, thus making calculations simpler.

The following equations may need to be solved to find the affine transform parameters (a, b):

$$C[k-N]=a\cdot Y[k-N]+b$$

$$C[0]=a\cdot Y[0]+b$$

$$C[k+N]=a\cdot Y[k+N]+b \quad (6)$$

As it is unlikely that there will be unique (a, b) for the Equations (6), least squares optimization may be used to find (a, b) that minimizes error:

$$\underset{(a,b)}{\operatorname{argmin}} \sqrt{\sum_{i=-N}^{N} \varepsilon[k+i]^2} \quad (7)$$

where $$\varepsilon[k-N] = C[k-N] - (a \cdot Y[k-N] + b)$$

$$\varepsilon[0] = C[0] - (a \cdot Y[0] + b)$$

$$\varepsilon[k+N] = C[k+N] - (a \cdot Y[k+N] + b) \quad (8)$$

To solve for the optimization problem presented above, the following matrix equations may be used:

$$\underset{(a,b)}{\operatorname{argmin}} \sum_{i=-N}^{N} \varepsilon[k+i]^2 = \underset{(a,b)}{\operatorname{argmin}} \vec{\varepsilon}^T \vec{\varepsilon} \quad (9)$$

where $\vec{\varepsilon} = \vec{c} - A\vec{x}$ $$A = \begin{bmatrix} Y[k-N] & 1 \\ Y[k-N+1] & 1 \\ \vdots & \vdots \\ Y[k+N-1] & 1 \\ Y[k+N] & 1 \end{bmatrix}, \quad (10)$$

$$\vec{\varepsilon} = \begin{bmatrix} \varepsilon[k-N] \\ \varepsilon[k-N+1] \\ \vdots \\ \varepsilon[k+N-1] \\ \varepsilon[k+N] \end{bmatrix},$$

$$\vec{c} = \begin{bmatrix} c[k-N] \\ c[k-N+1] \\ \vdots \\ c[k+N-1] \\ c[k+N] \end{bmatrix},$$

$$\vec{x} = \begin{bmatrix} a \\ b \end{bmatrix}$$

The minimum mean-square estimation value may then be found by solving $$\frac{d\vec{\varepsilon}^T \vec{\varepsilon}}{d\vec{x}} = 0.$$

$$\frac{d}{d\vec{x}}(\vec{\varepsilon}^T \vec{\varepsilon}) = \frac{d}{d\vec{x}}\left((\vec{c} - A\vec{x})^T \cdot (\vec{c} - A\vec{x})\right) \quad (11)$$

$$= \frac{d}{d\vec{x}}(\vec{x}^T A^T A\vec{x} - \vec{c}^T A\vec{x} - \vec{x}^T A^T \vec{c} + \vec{c}^T \vec{c})$$

$$= 2A^T A\vec{x} - 2A^T \vec{c}$$

Accordingly, the following (a, b) values may minimize the above errors.

$$\hat{\vec{x}}_{MSE} = (A^T A)^{-1} A^T \vec{c} = \begin{bmatrix} a_{MSE} \\ b_{MSE} \end{bmatrix} \quad (12)$$

The above equation may be simplified to:

$$a_{MSE} = \frac{(M \cdot S_{YC}(k) - S_Y(k) \cdot S_C(k))}{M \cdot S_{Y^2}(k) - (S_Y(k))^2} \quad (13)$$

$$b_{MSE} = \frac{(-S_Y(k) \cdot S_{YC}(k) + S_{Y^2}(k) \cdot S_C(k))}{M \cdot S_{Y^2}(k) - (S_Y(k))^2}$$

It may be noted that all the elements needed to compute the (a, b) pair in Equation (13) are exactly the same as those need for computing the correlation confidence measure α—local sum, local sum of squares, local sum of cross products. The calculation of values may be design dependent, for example, via hardware and/or software. Accordingly, the Equations (3), (5), and (13) may enable generation of signal components $C_{corrected}$.

Furthermore, the effects of the low pass filter block 204 may improve the quality of the correlation confidence measure α and the affine transform parameters [a, b] by filtering the U and V chroma signals and the Y luma signal to remove some of the high frequency noises in the signals.

In certain instances, a denominator in the Equation (5) or (13) may become zero. For example, $M \cdot S_{Y^2}(k) - (S_Y(k))^2$ may be zero or $M \cdot S_{C^2}(k) - (S_C(k))^2$ may be zero. In instances when the luma signal is flat, that is, it has zero variance, $M \cdot S_{Y^2}(k) - (S_Y(k))^2$ may be zero. In these instances, there may not be a need for YC alignment. Accordingly the parameters α, a, and b may be set to zeros. In instances when the chroma signal is flat, $M \cdot S_{C^2}(k) - (S_C(k))^2$ may be zero. In these instances, the Pearson product moment correlation γ may be zero by definition. Accordingly, there may be no need for YC alignment and the parameters α, a, and b may again be set to zeros. The algorithm may therefore comprise the following portion:

---

If (M · $S_{Y^2}$ (k) – ($S_Y$(k))² == 0) || (M · $S_{C^2}$ (k) – ($S_C$(k))² == 0){
   $C_{corrected}$[k] = C[k];
}

---

A property of the Pearson product moment correlation coefficient is that it is scale-invariant. That is, the Pearson product moment correlation coefficient remains the same even when the vertical scale of either signal is changed. This property may be useful when the luma signal is noisy. However, the affine parameters [a, b] may change depending on the vertical scale of the luma signal transition. For example, the luma signal 502 may transition more than the luma signal 504 in a same period of time. Accordingly, the Pearson product moment correlation coefficient γ may remain the same for the chroma signal 500 and the luma signal 502, as for the chroma signal 500 and the luma signal 502. However, the scaling parameter 'a' for the chroma signal 500 and the luma signal 502 may be very different from the scaling parameter 'a' for the chroma signal 500 and the luma signal 504. The scaling parameter 'a' may be very small or very large, depending on the luma signal, while the dynamic range may be fixed.

Thus, if the luma signal is noisy to begin with, the estimate for the scaling parameter 'a' may not be very reliable. Accordingly, the YC alignment may be suppressed when the luma signal has small energy. This may be done by modifying the correlation confidence measure α based on the luma energy. A lookup table may also be used to suppress YC alignment in instances where there may be low correlation confidence measures although the change in the luma signal may not be considered to be small. The look-up table may, for example, take into account the correlation confidence measure α and/or the magnitude of change in luma. The lookup table may be design dependent.

Shown below is an exemplary algorithm for taking into account various luma energy levels:

```
if (M · S_Y² (k) − (S_Y(k))² < Th1){
    α = 0;
} else if (M · S_Y² (k) − (S_Y(k))² < Th2) {
    α = α / 32;
} else if (M · S_Y² (k) − (S_Y(k))² < Th3) {
    α = α / 16;
} else if (M · S_Y² (k) − (S_Y(k))² < Th4) {
    α = α / 8;
} else {
    ; // Do nothing
}
``` where the thresholds Th1, Th2, Th3, and Th4 may be changed by, for example, the processor 114. The number of thresholds, the setting of the thresholds, and/or the resulting correlation confidence measure α may be design dependent.

The corrected chroma signal may also be limited, for example, by an adaptive clamping function. The adaptive clamping function may be defined as:

$$C_{corrected}[k] = \text{CLAMP}(C_{corrected}[k], C[k] - g \cdot T, C[k] + g \cdot T); \quad (13)$$

where CLAMP(x, lo, hi) may be a function limiting 'x' within the range [lo, hi], and 'T' is a fixed constant. The parameter 'g' may determine how much the corrected chroma signal may vary from the original distorted chroma signal.

Figure 6A:
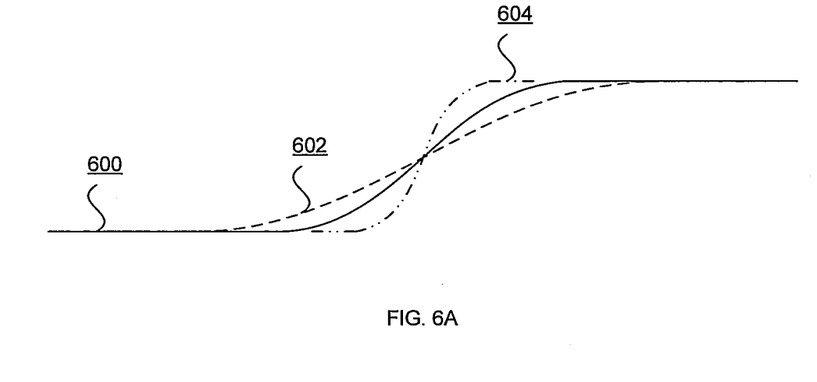
FIG. 6A comprises exemplary diagrams illustrating sharpening with clamping logic, in accordance with an embodiment of the invention.
Figure 6B:
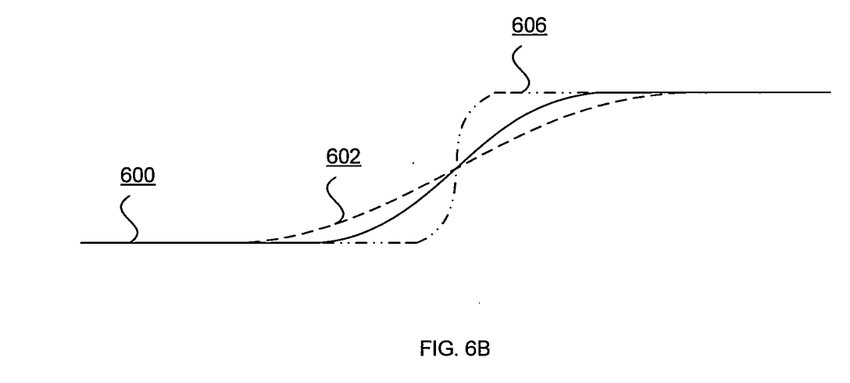
FIG. 6B comprises exemplary diagrams illustrating sharpening with clamping logic, in accordance with an embodiment of the invention.

FIGS. 6A and 6B comprise exemplary diagrams illustrating sharpening with clamping logic, in accordance with an embodiment of the invention. Referring to FIGS. 6A and 6B, there is shown an original signal 600, a low pass filtered signal 602, and a compensated signal 604. There is also shown a compensated signal 606 that may be the result of compensation to the original signal 600 by a compensation circuit. The compensation circuit may be similar to, for example, the compensation block 320 that comprises the low pass filter block 322. The low pass filter block 322 may filter glitches that may be introduced by the YC alignment block 206. The compensation block 320 may filter out unnecessary glitches without sacrificing the sharpness recovered by the YC alignment. The difference between the slope of the compensated signal 604 and the compensated signal 606 may be, for example, gain of the variable gain amplifier block 326. The greater the gain, the sharper the slope of the compensated signal. However, the higher gain may also introduce overshoot and undershoot that may be visible as visible artifacts.

To reduce overshoot and undershoot while allowing high gain, an adaptive clamping algorithm may be used. The adaptive clamping algorithm may determine clamping values that may limit the range of the high-frequency components by the minimum and maximum values of the neighboring values of the input signal. A clamping window, whose size may be changed, may be used to determine the clamping values. An embodiment of the invention may allow the clamping window to comprise those pixels that are within the transition region of the signal being processed. An exemplary adaptive clamping algorithm is described by the pseudo-code below:

```
// Sharpening Algorithm with Clamping Logic
high_freq_value = org_signal[t] − lpf_signal[t];
// Computing the min and max value around 'org_signal[t]'
// given a window size, which is programmable.
min_val = find_min(org_signal, t, clamp_window_size);
max_val = find_max(org_signal, t, clamp_window_size);
new_signal[t] = clamp(org_signal, gain*high_freq_value,
    min_val, max_val);
```

The variable high_freq_value may be the result of subtracting a low-pass filtered signal lpf_signal[t] from the original signal org_signal[t] that was low-pass filtered. The variable min_val may be the minimum value found in the clamping window, and the variable max_val may be the maximum clamping value found in the clamping window. The variable new_signal may be the new signal generated.

Figure 7:
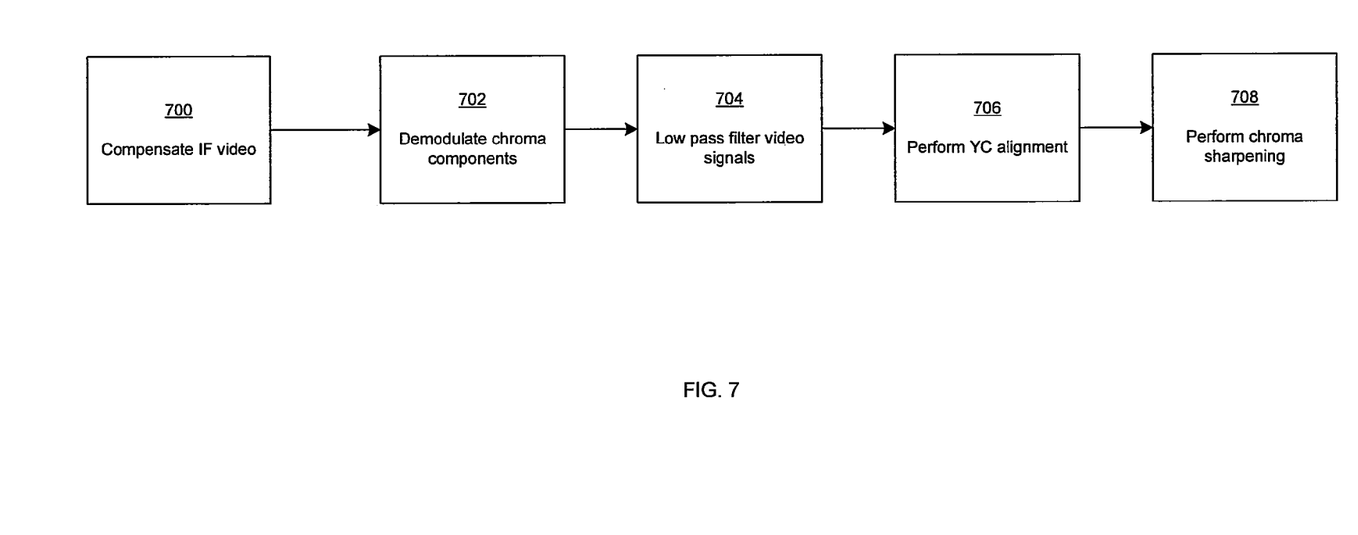
FIG. 7 is a flow diagram illustrating exemplary steps for processing chroma signals, in accordance with an embodiment of the invention.

FIG. 7 is a flow diagram illustrating exemplary steps for processing chroma signals, in accordance with an embodiment of the invention. Referring to FIG. 7, there is shown steps 700 to 708. In step 700, the compensation block 200 may provide compensation to the composite chroma signal for distortions that may have been introduced, for example, due to audio trap filtering during the modulation and/or demodulation process. In step 702, the compensated composite chroma signal may then be demodulated by the chroma demodulation block 202 to generate U and V chroma signals. In step 704, the U and V chroma signals may be low pass filtered by the low pass filter block 204, and the low pass filtered U and V chroma signals may be communicated to the YC alignment block 206. The Y luma signal may also be low pass filtered by the low pass filter block 204. Filtering by the low pass filter block 204 may, for example, attenuate high-frequency distortions in the U and V chroma signals and may reduce noise sensitivity to noise for the Y luma signal during YC alignment.

In step 706, the YC alignment block 206 may determine correlation between the U and V chroma signals and the Y luma signal. Depending on the correlation, the YC alignment block 206 may generate a signal portion using a portion of the Y luma signal. The generated signal portion may then be used to replace a corresponding signal portion of the U and V chroma signals. This may be useful, for example, because the composite chroma signal may use a smaller portion of a television channel bandwidth than a luma signal. Accordingly, the composite chroma signal may be more susceptible to interference and noise distortions. Additionally, the composite chroma signal may have more distortions because of a need for asymmetric frequency spectrum around a chroma sub-carrier due to audio trap filtering.

In step 708, the YC aligned U and V chroma signals may then be communicated to the chroma sharpening block 208. The chroma sharpening block 208 may function similarly to the compensation block 200. The chroma sharpening block 208 may also provide adaptive clamping to reduce overshoot and undershoot of the U and V chroma signals. Overshoots and undershoots may be undesirable since they may introduce visible artifacts such as "false colors" to displayed video.

Accordingly, the algorithm for CY aligning and chroma sharpening may be described by:

```
// compute S_{Y^2}(k), S_Y(k), S_{C^2}(k), S_C(k), S_{YC}(k)
...
if (M · S_{Y^2}(k) – (S_Y(k))^2 == 0) || (M · S_{C^2}(k) – (S_C(k))^2 == 0){
    C_{corrected}[k] = C[k];
} else {
    // Compute α and (a, b)
    ...
        // Adjusting α based on the luma variance
        if (M · S_{Y^2}(k) – (S_Y(k))^2 < Th1){
            α = 0;
        } else if (M · S_{Y^2}(k) – (S_Y(k))^2 < Th2) {
            α = α / 32;
        } else if (M · S_{Y^2}(k) – (S_Y(k))^2 < Th3) {
            α = α / 16;
        } else if (M · S_{Y^2}(k) – (S_Y(k))^2 < Th4) {
            α = α / 8;
        } else {
            ; // Do nothing
        }
    // Apply the LUT for alpha
    // Correcting the chroma value
    C_{corrected}[k] = α · (a · Y[k] + b) + (1 – α) · C[k];
    // Clamping the correction value
    C_{corrected}[k] = CLAMP(C_{corrected}[k], C[k] – g · T, C[k] + g · T);
    // LPF to remove potential glitches from YC alignment
}
```

In accordance with an embodiment of the invention, aspects of an exemplary system may comprise, for example, the compensation block 200 that may enable amplifying high frequency signal levels of a modulated chroma signal to compensate for distortions due to audio trap filtering. The compensation block 200 may comprise, for example, a low pass filter 322 or a high pass filter 342. The compensated chroma signal may then be communicated to the chroma demodulation block 202, which may enable generation of U and V chroma signals. The U and V chroma signals may be filtered by the low pass filter block 204. A Y luma signal may also be filtered by the low pass filter block 204. However, the characteristics of low pass filtering of the U and V chroma signals may not necessarily be the same as the characteristics of the low pass filtering of the Y luma signal. Accordingly, the low pass filtering block 204 may comprise separate filters for filtering the U and V chroma signals and for filtering the Y luma signal.

The filtered U and V chroma signals may then be communicated to the YC alignment block 206, which may determine a correlation value for corresponding portions of U and V chroma signals and the Y luma signal. The correlation value may comprise, for example, a Pearson product moment correlation. The YC alignment block 206 may generate correction signal for the U and V chroma signals based on the correlation value and/or energy level of the Y luma signal, when the correlation value is more than a threshold value. The YC alignment block 206 may replace portions of the U and V chroma signals with the generated corrected signal, when the correlation value is more than a threshold value.

The corrected U and V chroma signals may be communicated to the chroma sharpening block 208. The U and V chroma signals may be processed by the chroma sharpening block 208. The processing may comprise, for example, increasing a slope of transitions, or chroma sharpening, and also clamping the sharpened chroma signals to reduce overshoot and undershoot. The chroma sharpening block 208 may control chroma sharpening by changing a gain parameter for an amplifier.

In some embodiment of the YC alignment block, for example, each of the U and V chroma signals may each be correlated to the Y luma signal, and a correction signal may be generated for each of the U and V chroma signals independently. Various embodiments of the invention may also compare the correlation using U and V chroma signals, and select one to provide correction for both the U and V chroma signals. Various other embodiments of the invention may perform correlation on only one of the U and V chroma signals, and use that correlation to provide correction for both U and V chroma signals.

Another embodiment of the invention may provide a machine-readable storage, having stored thereon, a computer program having at least one code section executable by a machine, thereby causing the machine to perform the steps as described above for processing chroma signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for video processing, the method comprising:
   determining a correlation value for corresponding portions of U and V chroma signals and a luma signal;
   generating a correction signal by scaling, shifting, or scaling and shifting said luma signal;
   replacing each of said U and V chroma signals with said correction signal when said correlation value is more than a threshold value; and
   performing chroma sharpening with adaptive clamping for said U and V chroma signals after said U and V chroma signals are replaced with said correction signal, when said correlation value is more than said threshold value.

2. The method according to claim 1, wherein said correlation value comprises a Pearson product moment correlation.

3. The method according to claim 1, comprising processing a modulated chroma signal to compensate for distortions due to audio trap filtering, prior to generating said correction signal.

4. The method according to claim 3, wherein said processing comprises one of low pass filtering or high pass filtering.

5. The method according to claim 3, comprising demodulating said modulated chroma signal to generate said U and V chroma signals.

6. The method according to claim 1, comprising low pass filtering said U and V chroma signals prior to determining said correlation value.

7. The method according to claim 1, comprising performing chroma sharpening with adaptive clamping for said U and V chroma signals after generation of said correction signal, when said correlation value is not more than said threshold value.

8. The method according to claim 7, comprising varying a gain parameter used in said chroma sharpening with adaptive clamping.

9. The method according to claim 1, wherein said correction signal corresponds to a scaled and shifted version of said luma signal.

10. A system for video processing, the system comprising:
one or more circuits configured to determine a correlation value for corresponding portions of U and V chroma signals and a luma signal;
said one or more circuits configured to generate a correction signal by scaling, shifting, or scaling and shifting said luma signal;
said one or more circuits configured to replace each of said U and V chroma signals with said correction signal, when said correlation value is more than a threshold value; and
said one or more circuits are configured to perform chroma sharpening with adaptive clamping for said U and V chroma signals after said U and V chroma signals are replaced with said correction signal, when said correlation value is more than said threshold value.

11. The system according to claim 10, wherein said correlation value comprises a Pearson product moment correlation.

12. The system according to claim 10, wherein said one or more circuits are configured to process a modulated chroma signal to compensate for distortions due to audio trap filtering, prior to generating said correction signal.

13. The system according to claim 12, wherein said processing comprises one of low pass filtering or high pass filtering.

14. The system according to claim 12, wherein said one or more circuits are configured to generate said U and V chroma signals from said modulated chroma signal.

15. The system according to claim 10, wherein said one or more circuits are configured to perform low pass filtering of said U and V chroma signals prior to determining said correlation value.

16. The system according to claim 10, wherein said one or more circuits are configured to perform chroma sharpening with adaptive clamping for said U and V chroma signals after generation of said correction signal, when said correlation value is not more than said threshold value.

17. The system according to claim 16, wherein said one or more circuits are configured to change a gain parameter used in said chroma sharpening with adaptive clamping.

18. The system according to claim 10, wherein said correction signal corresponds to a scaled and shifted version of said luma signal.

19. A system for video processing, the system comprising:
one or more circuits configured to perform intermediate frequency (IF) compensation of a composite chroma signal;
said one or more circuits configured to perform low pass filtering of U and V chroma signals, wherein said U and V chroma signals are derived from said composite chroma signal;
said one or more circuits configured to perform luma/chroma (YC) alignment of said low pass filtered U and V chroma signals; and
said one or more circuits configured to perform chroma sharpening with adaptive clamping of said YC aligned low pass filtered U and V chroma signals after said low pass filtered U and V chroma signals are replaced with a correction signal generated by scaling or shifting corresponding luma signal, when a correlation value of said low pass filtered U and V chroma signals and said corresponding luma signal is more than a threshold value, wherein said adaptive clamping being performed based at least in part on a high frequency value determined by subtracting said low pass filtered U and V chroma signals from said U and V chroma signals.

20. A method for video processing, the method comprising:
intermediate frequency (IF) compensating a composite chroma signal;
demodulating said composite chroma signal to generate U and V chroma signals;
low pass filtering said U and V chroma signals;
luma/chroma (YC) aligning said low pass filtered U and V chroma signals; and
performing chroma sharpening with adaptive clamping of said YC aligned low pass filtered U and V chroma signals after said low pass filtered U and V chroma signals are replaced with a correction signal generated by scaling or shifting corresponding luma signal, when a correlation value of said low pass filtered U and V chroma signals and said corresponding luma signal is more than a threshold value, wherein said adaptive clamping being performed based at least in part on a high frequency value determined by subtracting said low pass filtered U and V chroma signals from said U and V chroma signals.

* * * * *